UNITED STATES PATENT OFFICE.

WM. B. RICHARDS, OF NEW YORK, N. Y.

IMPROVED METHOD OF PREVENTING THE CORROSION OR STAINING OF THE SURFACE OF GLASS.

Specification forming part of Letters Patent No. 47,040, dated March 28, 1865.

*To all whom it may concern:*

Be it known that I, WILLIAM B. RICHARDS, of the city and State of New York, have invented or discovered a Mode of Preventing Corrosion or Staining of the Surface of Glass; and I do hereby declare the following to be a full, clear, and exact description of the said invention and of the objects accomplished by the same.

In the manufacture of glass—particularly window and plate glass—the brilliancy of the surface is destroyed or greatly injured by the action of the atmosphere. This is particularly the case with glass that may be made and remain packed in boxes or stored away during the warm and moist weather of summer. This atmospheric action gives to the surface of the glass a frosted appearance, or sometimes an iron-rust and rainbow colors in streaks and irregular stains. These greatly interfere with the sale of the glass and are troublesome to remove; but after the glass has been introduced into sashes or otherwise exposed to the action of air and light while in use, said corrosion or stain very seldom appears if the brilliancy of the glass is maintained until the glass is unpacked and used. This corrosion or stain appears to arise from the absorption of moisture by the alkali employed in the manufacture of the glass, particularly in the minute cells existing in the surface of the glass. To close these minute cells and exclude the alkaline material of the glass from atmospheric influence as quickly as possible after the glass has been manufactured is the object of my invention, so that the luster of the glass may not be impaired by atmospheric influence, particularly while boxed for transportation or while on storage. For this purpose I make use of very finely-ground calcined plaster-dust, or other or similar material that will absorb moisture more quickly than the alkali of the glass; and this powder I apply as a dry dusting to the surface of the glass, sufficient adhering for effecting the desired protection to the surface against atmospheric changes or influences. This material, however, might be applied as a paste, in a thin coating, to the surface if the glass were of an expensive character.

What I claim, and desire to secure by Letters Patent, is—

The mode herein specified of protecting the surface of glass, after it has been manufactured, from corrosion and staining, as set forth.

In witness whereof I have hereunto set my signature this 25th day of February, 1865.

W. B. RICHARDS.

Witnesses:
 LEMUEL W. SERRELL,
 CHAS. H. SMITH.